United States Patent Office 3,491,102
Patented Jan. 20, 1970

---

3,491,102
2-HYDROXY - 3,5 - DIHYDROCARBYLBENZYL 3-HYDROCARBYL - 4 - HYDROXY-5-(DIALKYL-AMINOMETHYL) PHENYL SULFIDE
Francis X. O'Shea, Naugatuck, Conn., and Gordon Paul Sage, Charleston, W. Va., assignors to Uniroyal, Inc., New York, N.Y., a corporation of New Jersey
No Drawing. Filed May 17, 1967, Ser. No. 639,014
Int. Cl. C07d 29/36
U.S. Cl. 260—293.4        5 Claims

ABSTRACT OF THE DISCLOSURE

This invention is concerned with a new series of compounds found to be useful as antioxidants, and their novel method of production. The compounds, described as 2-hydroxy-3,5 - dihydrocarbylbenzyl - 3 - hydrocarbyl-4-hydroxy-5-(dialkylaminomethyl) phenyl sulfides are particularly effective in retarding oxidative deterioration.

---

Our invention relates to a new series of compounds which have proven useful as antioxidants for organic materials, e.g., rubber, plastics, fats, and petroleum products.

The compounds of this invention may be represented by the formula:

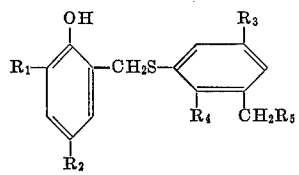

wherein $R_1$, $R_2$ and $R_3$ are selected from the group consisting of alkyl groups of from 1 to 12 carbon atoms each, cycloalkyl groups of from 6 to 8 carbon atoms and aralkyl groups of from 7 to 9 carbon atoms, $R_4$ is selected from the group consisting of hydrogen and methyl and $R_5$ is selected from the group consisting of diloweralkylamino, morpholinyl, pyrrolidinyl and piperidinyl groups.

Our invention is also concerned with the novel method of preparing the aforementioned compounds. This method involves the reaction of 1 molar equivalent of a compound (hereinafter referred to as intermediate "A") of the general formula:

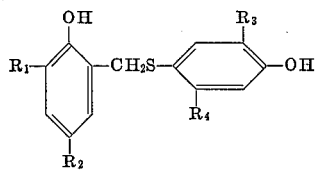

wherein $R_1$, $R_2$, $R_3$ and $R_4$ are as previously described, with 1 molar equivalent of formaldehyde and 1 molar equivalent of a diloweralkylamine, morpholine, pyrrolidine or piperidine. This reaction, carried out under those conditions set forth for the well-known Mannich reaction, may be represented by the following equation:

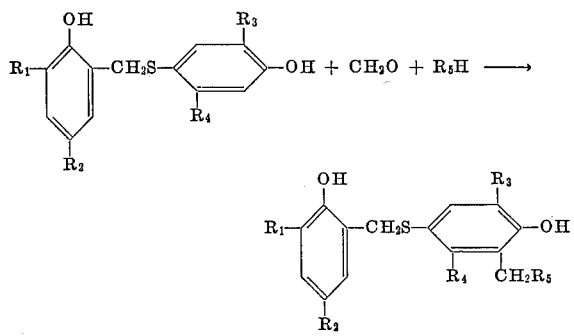

wherein $R_1$, $R_2$, $R_3$, $R_4$ and $R_5$ are as previously described.

In U.S. Patent 3,179,701, issued on Apr. 20, 1965 to A. L. Rocklin new antioxidant compounds of the following formula were disclosed:

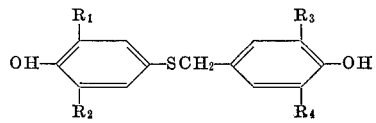

wherein $R_1$, $R_2$, $R_3$ and $R_4$ are alkyl groups of from 1 to 8 carbon atoms.

Although our compounds may generally be described as isomers of the compounds described by the Rocklin patent above, varying in the hydroxyl function of the benzyl portion of the molecule, i.e., the hydroxyl is ortho to the methylene group rather than para, and also varying in the substitution of the diloweralkylaminomethyl groups in place of an alkyl group on the phenyl portion of the molecule; it is observed that these structural differences provide both unexpected and important advantages over the prior art compounds. Specifically, our compounds possess superior non-discoloring properties while maintaining high activity, which property will be evidenced by the examples stated below.

The method of preparation employed by Rocklin in the aforementioned patent is so clearly distinguishable from our novel process as to require no comparison.

The intermediate "A" may be prepared by treating one molar equivalent of a compound (hereinafter referred to as intermediate "B") of the general formula:

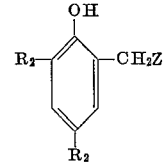

in which $R_1$ and $R_2$ are as previously described and Z is selected from the group consisting of:
(a) a benzothiazolyl radical,

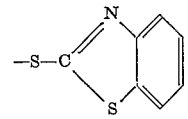

(b) a group of the formula:

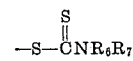

in which $R_6$ and $R_7$ are lower alkyl groups with one molar equivalent of a mercaptophenol of the formula,

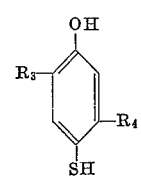

in which $R_3$ and $R_4$ are as previously described and one molar equivalent of an alkali metal hydroxide.

The reaction used to prepare intermediate "A" may be carried out in a suitable water miscible solvent such as methanol, ethanol, isopropanol, dioxane, ethylene glycol dimethyl ether, etc. at a temperature from about room temperature to about 100° C.

Preferred solvents for this reaction are methanol, ethanol and isopropanol, while the preferred temperature is in the range of 50° C. to 100° C. The reaction is ordinarily carried out at or near the reflux temperature of the solution, and a preferred reaction time of up to 4 hours is advisable. Longer times may be used, however they are not necessary as the reaction is generally completed within 30 minutes.

The intermediate "B" compounds, which are 2-hydroxy-3,5-dihydrocarbylbenzyl benzothiazolyl sulfides, are prepared by reacting 1 molar equivalent of a 2,4-dihydrocarbylphenol of the formula:

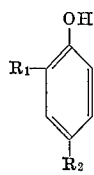

in which $R_1$ and $R_2$ are as previously described with one molar equivalent of formaldehyde and one molar equivalent of 2-mercaptobenzothiazole under acid conditions in a reaction similar to that described by Sebrell in U.S. Patents 2,134,957 (Nov. 1, 1938) and 2,150,463 (Mar. 14, 1939).

The intermediate "B" compounds, which are 2-hydroxy-3,5-dihydrocarbylbenzyl N-N-dialkyldithiocarbamates, are prepared by reacting a compound of the formula:

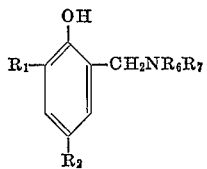

wherein $R_6$ and $R_7$ are as previously described with carbon disulfide in a manner similar to that described by A. F. Hardman in U.S. Patent 2,757,174 (July 31, 1956).

The 2,4-dihydrocarbylphenols which may be used in the preparation of intermediate "B" include but are not limited to:

2,4-dimethylphenol
2-methyl-4-t-butylphenyl
2-t-butyl-4-methylphenol
2,4-di-t-butylphenol
2-methyl-4-cyclohexylphenol
2-cyclohexyl-4-methylphenol
2,4-dicyclohexylphenol
2-methyl-4-cyclooctylphenol
2-cyclooctyl-4-methylphenol
2,4-dicyclooctylphenol
2-methyl-4-t-octylphenol
2-t-octyl-4-methylphenol
2,4-di-t-octylphenol
2-nonyl-4-methylphenol
2,4-dinonylphenol
2-dodecyl-4-methylphenol
2,4-didodecylphenol
2-(alpha-methylbenzyl)-4-methylphenol
2,4-di(alpha-methylbenzyl)phenol
2-(alpha,alpha-dimethylbenzyl)-4-methylphenol and
2,4-di(alpha,alpha-dimethylbenzyl)phenol.

The mercaptophenols which may be used in the preparation of intermediate "A" include but are not limited to:

2-methyl-4-mercaptophenol
2,5-dimethyl-4-mercaptophenol
2-isopropyl-4-mercaptophenol
2-isopropyl-4-mercapto-5-methylphenol
2-t-butyl-4-mercaptophenol
2-t-butyl-4-mercapto-5-methylphenol
2-t-octyl-4-mercaptophenol
2-t-octyl-4-mercapto-5-methylphenol
2-cyclohexyl-4-mercaptophenol
2-cyclohexyl-4-mercapto-5-methylphenol
2-cyclooctyl-4-mercaptophenol
2-cyclooctyl-4-mercapto-5-methylphenol
2-(alpha-methylundecyl)-4-mercaptophenol
2-(alpha-methylundecyl)-4-mercapto-5-methylphenol
2-(alpha-methylbenzyl)-4-mercaptophenol
2-(alpha-methylbenzyl)-4-mercapto-5-methylphenol
2-(alpha,alpha-dimethylbenzyl)-4-mercaptophenol and
2-(alpha,alpha-dimethylbenzyl) - 4-mercapto - 5-methylphenol.

The amines which may be used to prepare the Mannich base from intermediate "A" include dimethylamine, methylethylamine, diethylamine, dipropylamine, dibutylamine, diamylamine, morpholine, pyrrolidine and piperidine.

To illustrate the novel compounds and their methods of preparation, the following examples are given. It should be understood, however, that these examples are merely illustrative and are not to be regarded as limitations to the appended claims since the basic teachings thereof may be varied at will, as will be understood by one skilled in the art.

EXAMPLE 1

Preparation of 2-hydroxy-3-t-butyl-5-methylbenzyl 3-methyl - 4 - hydroxy - 5 - (dimethylaminomethyl)phenyl sulfide.

To a solution of 31.6 g. (0.1 mole) of 2-hydroxy-3-t-butyl-5-methylbenzyl 3-methyl-4-hydroxyphenyl sulfide and 10.3 g. (0.1 mole) of 40% aqueous dimethylamine in 100 ml. of ethanol was added 8.6 g. (0.1 mole) of 37% aqueous formaldehyde with cooling to keep the temperature below 30° C. The reaction mixture was stirred for 30 minutes at room temperature and then was heated at reflux for 1.5 hours. The solution was then poured into water and the product which separated was extracted with ether. The ether solution was washed with water, dried with anhydrous sodium sulfate and evaporated down to yield 36 g. (97%) of 2-hydroxy-3-t-butyl-5-methylbenzyl 3-methyl-4-hydroxy-5-(dimethylaminomethyl)phenyl sulfide as a light tan oil.

Analysis.—Calc'd for $C_{22}H_{31}NO_2S$: C, 70.77%; H, 8.31%; N, 3.75%; S, 8.57%. Found: C, 70.70%; H, 8.07%; N, 3.69%; S, 8.81%.

Example 2

Preparation of 2-hydroxy-3-($\alpha,\alpha$-dimethylbenzyl)-5 methylbenzyl 3 - methyl - 4 - hydroxy - 5 - (dimethylaminomethyl)phenyl sulfide.

2 - hydroxy - 3 - ($\alpha,\alpha$-dimethylbenzyl) - 5 - methylbenzyl 3-methyl-4-hydroxyphenyl sulfide was reacted with formaldehyde and dimethylamine in the same manner as described in Example 1 to yield 2-hydroxy-3-($\alpha,\alpha$-dimethylbenzyl) - 5 - methylbenzyl 3 - methyl - 4 - hydroxy-5-(dimethylaminomethyl)phenyl sulfide as a viscous oil.

Example 3

Preparation of 2-hydroxy-3-(1,1,3,3-tetramethylbutyl)-5 - methylbenzyl 3 - methyl - 4 - hydroxy - 5 - dimethylaminomethyl)phenyl sulfide.

2 - hydroxy - 3 - (1,1,3,3-tetramethylbutyl) - 5 - methylbenzyl 3-methyl-4-hydroxyphenyl sulfide was reacted with formaldehyde and dimethylamine in the same manner as described in Example 1 to yield 2-hydroxy-3-(1,1,3,3-tetramethylbutyl) - 5 - methylbenzyl 3 - methyl - 4-hydroxy-5-(dimethylaminomethyl)phenyl sulfide as a viscous oil.

Example 4

Preparation of 2-hydroxy-3-methyl-5-t-butylbenzyl 3-methyl - 4 - hydroxy - 5 - (dimethylaminomethyl)phenyl sulfide.

2 - hydroxy - 3 - methyl - 5 - t - butylbenzyl 3 - methyl-4-hydroxyphenyl sulfide was reacted with formaldehyde and dimethylamine in the same manner as described in Example 1 to yield 2-hydroxy-3-methyl-5-t-butylbenzyl 3-methyl-4-hydroxy-5-(dimethylaminomethyl)phenyl sulfide as a viscous oil.

Example 5

The preparation of 2-hydroxy-3-t-butyl-5-methylbenzyl 3-methyl-4-hydroxy-5-piperidinylmethylphenyl sulfide.

2 - hydroxy - 3 - t - butyl - 5 - methylbenzyl 3 - methyl-4-hydroxyphenyl sulfide was reacted with formaldehyde and piperidine in the same manner as described in Example 1 to yield 2-hydroxy-3-t-butyl-5-methylbenzyl 3-methyl-4-hydroxy-5-piperidinylmethylphenyl sulfide as a crystalline solid, M.P. 123–124° after recrystallization from aqueous ethanol.

Analysis.—Calc'd for $C_{25}H_{35}NO_2S$: C, 72.60%; H, 8.50%; N, 3.40%; S, 7.74%. Found: C, 72.81%; H, 8.61%; N, 3.75%; S, 7.90%.

Example 6

The preparation of 2-hydroxy-3-t-butyl-5-methylbenzyl 3 - methyl - 4 - hydroxy - 5 - pyrrolidinylmethylphenyl sulfide.

2 - hydroxy - 3 - t - butyl - 5 - methylbenzyl 3 - methyl-4-hydroxyphenyl sulfide was reacted with formaldehyde and pyrrolidine in the same manner as described in Example 1 to yield 2-hydroxy-3-t-butyl-5-methylbenzyl 3-methyl-4-hydroxy-5-pyrrolidinylmethylphenyl sulfide as a viscous oil in 98% yield.

Example 7

The preparation of 2-hydroxy-3-t-butyl-5-methylbenzyl 3 - t - butyl - 4 - hydroxy - 5 - piperidinylmethylphenyl sulfide.

2 - hydroxy - 3 - t - butyl - 5 - methylbenzyl 3 - t - butyl-4-hydroxyphenyl sulfide was reacted with formaldehyde and piperidine in the same manner as described in Example 1 to yield 2-hydroxy-3-t-butyl-5-methylbenzyl 3-t-butyl-4-hydroxy-5-piperidinylmethylphenyl sulfide as a viscous oil in 95% yield.

Example 8

The preparation of 2-hydroxy-3-t-butyl-5-methylbenzyl 3-t-butyl-4-hydroxy-5-pyrrolidinylmethylphenyl sulfide.

2 - hydroxy - 3 -t - butyl - 5 - methylbenzyl 3 - t - butyl-4-hydroxyphenyl sulfide was reacted with formaldehyde and pyrrolidine in the same manner as described in Example 1 to yield 2-hydroxy-3-t-butyl-5-methylbenzyl 3-t-butyl-4-hydroxy-5-pyrrolidinylmethylphenyl sulfide as a viscous oil in 94% yield.

Example 9

The preparation of 2-hydroxy-3-cyclooctyl-5-methylbenzyl 3-methyl-4-hydroxy-5-(di-n-butyl-amino)methylphenyl sulfide.

2 - hydroxy 3 - cyclooctyl - 5 - methylbenzyl 3 - methyl-4-hydroxyphenyl sulfide was reacted with formaldehyde and di-n-butylamine in the same manner as described in Example 1 to yield 2-hydroxy-3-cyclooctyl-5-methylbenzyl 3 - methyl - 4 - hydroxy - 5 - (di-n-butylamino)methylphenyl sulfide as a viscous oil.

Example 10

This example demonstrates the usefulness of the compounds of the invention as stabilizers for polyisoprene.

A commercial cis-polyisoprene synthetic rubber containing 2,6-di-t-butyl-p-cresol as a stabilizer was used as the base polymer. The polymer was dissolved in benzene so as to provide a 2% polymer solution. An aliquot portion of a benzene solution of the compound to be evaluated was added so as to provide 1% by weight of the additive based upon the weight of polymer in the solution. A thin film of rubber was then deposited on a sodium chloride disk by evaporating 10 drops of the solution on the one inch diameter disk.

The disks were then placed in a 130° C. oven and removed after 30 minutes, one hour and every hour thereafter. At each interval, the infrared spectrum of the polymer film was obtained. Oxidation of the polymer film is evidenced by the appearance of a band at 5.85 $\mu$ in the spectrum caused by the development of carbonyl groups in the polymer. The time of aging required for the appearance of this band in the spectrum is taken as the break time. The effectiveness of compounds as stabilizers can be evaluated by the length of time they protect the rubber against oxidation as determined by this carbonyl development test.

| Added stabilizer: | Hour to break |
|---|---|
| None | ½ |
| 3-methyl-4-hydroxy-5-t-butylbenzyl, 3-methyl-4-hydroxy-5-t-butylphenyl sulfide | 4 |
| 3,5-di-t-butyl-4-hydroxybenzyl 3-methyl-4-hydroxy-5-t-butylphenyl sulfide | 4 |
| 2-hydroxy-3-t-butyl-5-methylbenzyl, 3-methyl-4-hydroxy-5-(dimethylaminomethyl)phenyl sulfide | 9 |

Non-discoloring characteristics were determined in this polymer by aging five grams of rubber obtained from the above described polymer solutions at 130° C. for two hours and observing for color formation.

| Added stabilizer: | Color |
|---|---|
| 3-methyl-4-hydroxy-5-t-butylbenzyl, 3-methyl-4-hydroxy-5-t-butylphenyl sulfide | Yellow. |
| 3,5-di-t-butyl-4-hydroxybenzyl 3 - methyl-4-hydroxy-5-t-butylphenyl sulfide | Yellow. |
| 2-hydroxy-3-t-butyl-5-methylbenzyl, 3-methyl-4-hydroxy-5-(dimethylaminomethyl) phenyl sulfide | Colorless. |

On continued aging of the above described bulk rubber samples at 130°, the polymer oxidizes as evidenced by a "melting down" of the sample. The time required to cause this effect is a further measure of the effectiveness of the stabilizer.

| Added stablizer: | Hour to break |
|---|---|
| None | 1 |
| 3-methyl-4-hydroxy-5-t-butylbenzyl, 3-methyl-4-hydroxy-5-t-butylphenyl sulfide | 7 |
| 2-hydroxy-3-t-butyl-5-methylbenzyl, 3-methyl-4-hydroxy-5-(dimethylaminomethyl)phenyl sulfide | 13 |

These results demonstrate the advantage of a compound of this invention over the compounds described by Rocklin.

Having thus described our invention, what we claim and desire to protect by Letters Patent is:

1. A chemical of the formula:

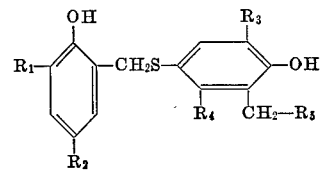

wherein $R_1$, $R_2$, and $R_3$ are selected from the group consisting of an alkyl group of from 1 to 12 carbon atoms, a cycloalkyl group of from 6 to 8 carbon atoms and a phenylalkyl group of from 7 to 9 carbon atoms, wherein $R_4$ is selected from the group consisting of hydrogen and methyl and where $R_5$ is selected from the group consisting of diloweralkylamino, N-morpholinyl, N-pyrrolidinyl and N-piperidinyl.

2. 2-hydroxy-3-t-butyl-5-methylbenzyl-3-methyl 4-hydroxy-5-(dimethylaminomethyl)phenyl sulfide.

3. 2-hydroxy-3-(α,α-dimethylbenzyl)-5-methylbenzyl 3-methyl - 4 - hydroxy-5-(dimethylaminomethyl)phenyl sulfide.
4. 2-hydroxy-3-(1,1,3,3-tetramethylbutyl) - 5 - methylbenzyl 3 - methyl - 4 - hydroxy-5-(dimethylaminomethyl) phenyl sulfide.
5. 2-hydroxy-3-t-butyl-5-methylbenzyl 3-methyl-4-hydroxy-5-N-piperdinylmethyl phenyl sulfide.

References Cited

UNITED STATES PATENTS 3,056,801  10/1962  Geschickter.
3,179,701  4/1965  Rocklin.

OTHER REFERENCES

Surrey: Name Reactions in Organic Chemistry, 1954, Academic Press Inc., Publisher, N. Y. pp. 118–120.
Shirley: Organic Chemistry, 1964, p. 751.

HENRY R. JILES, Primary Examiner
S. D. WINTERS, Assistant Examiner

U.S. Cl. X.R.

252—402; 260—570.9, 326.5, 247.1, 609, 306, 567, 624, 619.